United States Patent
Campbell et al.

(10) Patent No.: US 7,387,767 B2
(45) Date of Patent: Jun. 17, 2008

(54) RECOVERY OF NICKEL, COBALT, IRON, SILICA, ZINC AND COPPER FROM LATERITE ORE BY SULFURIC ACID LEACHING

(75) Inventors: Finlay Campbell, St. Albert (CA); Michael Collins, Fort Saskatchewan (CA); Ian Masters, Fort Saskatchewan (CA); Lyle Trytten, Edmonton (CA)

(73) Assignee: Dynatec Corporation, Fort Saskatchewan, Alberta (CA)

( * ) Notice: Subject to any disclaimer, the term of this patent is extended or adjusted under 35 U.S.C. 154(b) by 672 days.

(21) Appl. No.: 11/100,814

(22) Filed: Apr. 7, 2005

(65) Prior Publication Data

US 2006/0228279 A1    Oct. 12, 2006

(51) Int. Cl.
C22B 23/00 (2006.01)
(52) U.S. Cl. .......................... 423/141; 423/26; 423/37; 423/53; 423/99; 423/101; 423/150.3; 423/150.4; 423/139; 423/324; 75/739; 75/740
(58) Field of Classification Search ................ 423/53, 423/140, 141, 142, 150.3, 150.4, 324, 150.5, 423/37, 101, 26, 99, 139; 75/739, 740
See application file for complete search history.

(56) References Cited

U.S. PATENT DOCUMENTS 3,466,144 A * 9/1969 Kay ............................ 423/147
3,809,549 A * 5/1974 Opratko et al. ............. 423/140

OTHER PUBLICATIONS

Paper entitled "The Acid Pressure Leach Process for Nickel and Cobalt Laterite. Part I: Review of Operations at Moa" by Chalkey and Toirac, Jan. 1997.

Paper entitled "Murrin Murrin Nickel-Cobalt Project" by Motteram et al., May 1996.

Paper entitled "Development of Process Design for Coral Bay Nickel Project" by Tsuchida et al., 2004.

Paper entitled "The Calliope Project: Pressure Acid Leaching of Nickel Laterite Ores from New Caledonia" by Faris et al., 1997.

* cited by examiner

Primary Examiner—Steven Bos
(74) Attorney, Agent, or Firm—Arne I. Fors

(57) ABSTRACT

A process for recovering nickel and cobalt values from nickel- and cobalt-containing laterite ores as an enriched mixed nickel and cobalt sulphide intermediate and for producing nickel and cobalt metal from the nickel and cobalt sulphide intermediate. The laterite ore is leached as a slurry in a pressure acid leach containing an excess of aqueous sulphuric acid at high pressure and temperature, excess free acid in the leach slurry is partially neutralized to a range of 5 to 10 g/L residual free $H_2SO_4$ and washed to yield a nickel- and cobalt-containing product liquor, the product liquor is subjected to a reductant to reduce any Cr(VI) in solution to Cr(III), the reduced product liquor is neutralized to precipitate ferric iron and silicon at a pH of about 3.5 to 4.0, and the neutralized and reduced product liquor is contacted with hydrogen sulphide gas to precipitate nickel and cobalt sulphides. The precipitated nickel and cobalt sulphides can be leached in a water slurry in a pressure oxidation leach, the leach solution subjected to iron hydrolysis and precipitation, the iron-free solution contacted with zinc sulphide to precipitate copper, the iron- and copper-free solution subjected to zinc and cobalt extraction by solvent extraction to produce a nickel raffinate, the nickel raffinate contacted with hydrogen gas to produce nickel powder and the cobalt strip solution from the solvent extraction step contacted with hydrogen gas to produce cobalt powder.

12 Claims, 2 Drawing Sheets

RECOVERY OF NICKEL, COBALT, IRON, SILICA, ZINC AND COPPER FROM LATERITE ORE BY SULFURIC ACID LEACHING

BACKGROUND OF THE INVENTION (i) Field of the Invention

This invention relates to a process for recovering nickel and cobalt from nickel- and cobalt-containing laterite ores and, more particularly, relates to a process for producing an enriched nickel and cobalt sulphide intermediate from nickel-and cobalt-containing laterite ores, and for producing nickel and cobalt metal from the nickel and cobalt sulphide intermediate.

(ii) Description of the Related Art

Sulphuric acid leaching of laterite in pressure vessels has been practiced commercially since 1959 at Moa Bay in Cuba, as described by Chalkey and Toirac in a paper entitled "The acid pressure leach process for nickel and cobalt laterite. Part I: Review of operations at Moa" presented January, 1997. The original process plant includes ore leaching, washing of the ore leach discharge slurry in a counter-current decantation wash circuit (CCD wash circuit), reduction of the wash circuit product solution by contact with hydrogen sulphide, neutralization of the acid in the reduced solution with limestone mud, washing of the thickened neutralization solids in the CCD wash circuit, and recovery of nickel and cobalt as mixed sulphide by contact of the neutralized solution with hydrogen sulphide.

Neutralization of the solution prior to sulphide precipitation is required so that high recoveries of nickel and cobalt may be obtained in sulphide precipitation. The neutralization circuit is operated at pH 2.1 to 2.3, which is sufficiently high that metals recoveries are high in sulphide precipitation. However, the neutralized solution contains significant concentrations of silicon and iron at this relatively low pH, resulting in contamination of the mixed sulphide with these elements. This in turn limits the options for downstream processing of the mixed sulphide.

Sulphide precipitation is carried out at relatively high temperature and pressure in this operation, which results in a large recirculating load of hydrogen sulphide, which is expensive to recover and reuse. The sulphide precipitation step, when operated at the relatively high temperature and pressure, is sensitive to the presence of copper, which results in mixed sulphide with poor liquid-solid separation characteristics. Hence the need to precipitate copper in the reduction step prior to neutralization. The presence of copper in the neutralization solids places restrictions on how these solids can be washed in the CCD wash circuit, since the copper redissolves in this circuit if the solids are combined with slurry containing sufficient acid and ferric iron. This dictates the point of entry of the neutralization solids to the multi-stage wash circuit and limits the recovery of nickel and cobalt from the solution entrained with the neutralization solids. The use of process water in the wash circuit increases the fresh water load on the process plant.

The second laterite processing plant constructed to produce mixed sulphide intermediate from pressure acid leach liquor is situated at Murrin Murrin in Australia. The operation of this plant is described in a paper entitled "Murrin Murrin Nickel-Cobalt Project"0 presented by Motteram et al. May 31, 1996 and described in a paper entitled "Murrin Murrin CCD1 rake mechanism modification: the decision and the result" by Hewitt et al. Improvements to the process incorporated into the Murrin Murrin plant include a preneutralization of a portion of the ore leach discharge slurry (slurry neutralization) before liquid/solid separation in a CCD wash circuit. This limits the concentration of free sulphuric acid in the wash circuit and decreases the quantity of solids produced in a raw liquor neutralization step, which in turn limits soluble losses in the wash circuit. Although the same quantity of gypsum solids are produced with or without the slurry neutralization step, the gypsum solids in the slurry neutralization step are produced at higher temperature and have better liquid-solid separation characteristics. Sulphide precipitation is also successfully carried out under milder conditions than at Moa. The pH in the raw liquor neutralization step is maintained at about pH 2.5, hence contamination of the mixed sulphide with iron and silicon remains an issue. The thickener underflow slurry in the raw liquor neutralization step contains 20% solids at best. A portion of the thickener underflow slurry, enriched in the fines fraction following treatment in a hydrocyclone, is recycled to the raw liquor neutralization circuit; the remainder is directed to the CCD wash circuit. This complicated means of dealing with the raw liquor neutralization thickener underflow solids is necessitated by the poor liquid-solids separation characteristics of the slurry produced in the circuit.

A third acid leach/sulphide precipitation process plant recently commissioned in the Philippines is disclosed in a paper by Tsuchida et al. in 2004 entitled "Development of Process Design for Coral Bay Nickel Project". Preneutralization of autoclave discharge slurry prior to liquid-solid separation, further neutralization of the solution in a second neutralization with limestone, washing of this second neutralization precipitate in a CCD wash circuit and recycle of barren liquor to the wash circuit are practiced, with sulphide precipitation carried out under relatively mild conditions. A zinc removal step is included, using hydrogen sulphide gas to selectively precipitate zinc sulphide, before precipitation of nickel and cobalt sulphides. This separate zinc removal step is included so that the product mixed sulphide is substantially free of zinc, a requirement of the subsequent refining step in Japan. The wash circuit product solution is neutralized to pH 3.2 in the raw liquor neutralization circuit. Silicon remains in solution at this pH. Barren liquor is returned to the wash circuit without prior neutralization.

The design of a fourth application of laterite processing including precipitation of mixed sulphide intermediate has also been reported in a paper presented by Faris et al. in 1997 entitled "The Calliope Project: Pressure acid leaching of nickel laterite ores from New Caledonia". In this process, which was never commercialized, the ore leach discharge slurry from a pressure acid leach is thickened and washed and the solution is subjected to a reduction, a portion of the reduced solution is subjected to an atmospheric acid leach with a portion of the fresh ore, and the atmospheric leach slurry is thickened prior to neutralization of the combined product liquor and precipitation of mixed sulphides. Recycle of a portion of the raw liquor neutralization thickener underflow slurry to the raw liquor neutralization circuit is applied to increase the solids content of the thickener underflow slurry. In so doing, less of the concentrated nickel and cobalt bearing solution is directed to the wash circuit, improving overall nickel and cobalt recovery. Barren liquor from sulphide precipitation is neutralized with limestone and used as wash liquor in the CCD circuit.

The refining of mixed sulphide to nickel and cobalt metals is described in the Motteram et al. paper discussed above. The mixed sulphide is first solubilized in an oxidizing pressure leach. Iron is removed from the leach solution by pH adjustment with ammonia. Copper and zinc are precipitated as their sulphides by contact with hydrogen sulphide gas. The purified solution proceeds to solvent extraction, where cobalt is separated from nickel and these metals are precipitated as metal powders by reduction with hydrogen. Following stripping of residual metals in the nickel and cobalt reduction end solutions with hydrogen sulphide, ammonium sulphate is recovered from the process liquor by evaporation and crystallization.

SUMMARY OF THE INVENTION

It is a principal object of the present invention to provide a process for the extraction and recovery of nickel and cobalt from nickel- and cobalt-containing laterite ores as an enriched mixed nickel and cobalt sulphide intermediate in an economic and environmentally sound manner.

It is another object of the present invention to provide a process for efficient separation and recovery of high purity nickel and cobalt metals from a nickel and cobalt sulphide intermediate.

In its broad aspect, the process of the present invention for producing an enriched mixed nickel and cobalt sulphide intermediate from a laterite ore slurry containing nickel, cobalt, copper, zinc, chromium, iron and silicon comprises leaching the laterite ore slurry in a pressure acid leach containing sulphuric acid at high pressure and temperature for a time sufficient to extract nickel and cobalt, neutralizing excess acid in the leached slurry with limestone to a range of 5 to 10 g/L residual free $H_2SO_4$, washing the neutralized leached slurry to separate leached nickel and cobalt in a product liquor from residual solids, subjecting the product liquor to a reductant to reduce Cr(VI) in solution to Cr(III), neutralizing the reduced product liquor for hydrolyzing and precipitating impurities including ferric iron and silicon at a pH at about 3.8 to 4.0, separating precipitated solids from the neutralized liquor by a liquid-solid separation, and contacting the neutralized liquor with hydrogen sulphide gas to precipitate nickel and cobalt sulphides.

In a preferred embodiment of the process, the laterite ore slurry is leached in the acid pressure leach at a temperature in the range of about 240 to 300° C., preferably about 250 to 270° C., at a pressure in the range of about 450 to 1300 psig (3000 to 9000 kPa) for a retention time of 30 to 120 minutes, preferably about 60 to 90 minutes, with a controlled amount of aqueous sulphuric acid of at least 30 g/L of free sulphuric acid. The excess acid in the leach slurry is partially neutralized with the addition of an effective amount of limestone to produce a solution containing in the range of 5 to 10 g/L free sulphuric acid, at a temperature in the range of 90 to 95° C. and a retention time of about 30 to 60 minutes. Following liquid-solid separation, the product liquor is reduced with an excess of hydrogen sulphide for substantially complete reduction of Cr(VI) to Cr(III) and a partial reduction of any Fe(III) and the reduced product liquor is neutralized by the addition of limestone at a temperature in the range of 70 to 95° C. at a pH of about 3.8 for a retention time of about 60 to 120 minutes to hydrolyze and precipitate any Fe(III) and silicon, with the silicon precipitated to less than 0.1 g/L. At least a portion of the precipitated solids from the liquor neutralizaiton step is recycled to the same neutralization step in a ratio of between 1 to 4 parts of recycled solids to freshly precipitated solids, preferably a recycle ratio of about 2:1. The neutralized product liquor is contacted with hydrogen sulphide gas with a hydrogen sulphide overpressure in the range of 50 to 750 kPa for a retention time of 10 to 60 minutes to precipitate mixed sulphides of nickel and cobalt containing sulphides of zinc and copper. The mixed sulphides are thickened to yield a mixed sulphide product and a barren liquor, the barren liquor neutralized with limestone and the neutralized leach slurry washed with the neutralized barren liquor to separate the product liquor from the residual solids.

The process of the invention additionally comprises leaching the precipitated nickel and cobalt sulphides in a water slurry under oxygen pressure, thickening the leached precipitated nickel and cobalt sulphide slurry to produce a thickener underflow slurry and thickener overflow solution, subjecting the thickener underflow slurry to flotation for separating unleached mixed sulphide as a flotation concentrate from flotation tailings, combining flotation tailings with sulphide leach thickener overflow solution and subjecting the combined flotation tailings and sulphide leach overflow solution to iron hydrolysis and precipitation in an iron removal step, separating the iron removal solids, contacting the iron-free solution with zinc sulphide to precipitate copper, removing the copper precipitate, subjecting the iron- and copper-free solution to solvent extraction to extract zinc and cobalt to produce a nickel raffinate, contacting the nickel raffinate with hydrogen gas to produce nickel powder, and contacting the cobalt strip solution from the solvent extraction step with hydrogen gas to produce cobalt powder.

BRIEF DESCRIPTION OF THE DRAWINGS

The process of the invention will now be described with reference to the accompanying drawings, in which.

DESCRIPTION OF THE PREFERRED EMBODIMENT OF THE INVENTION

Figure 1:
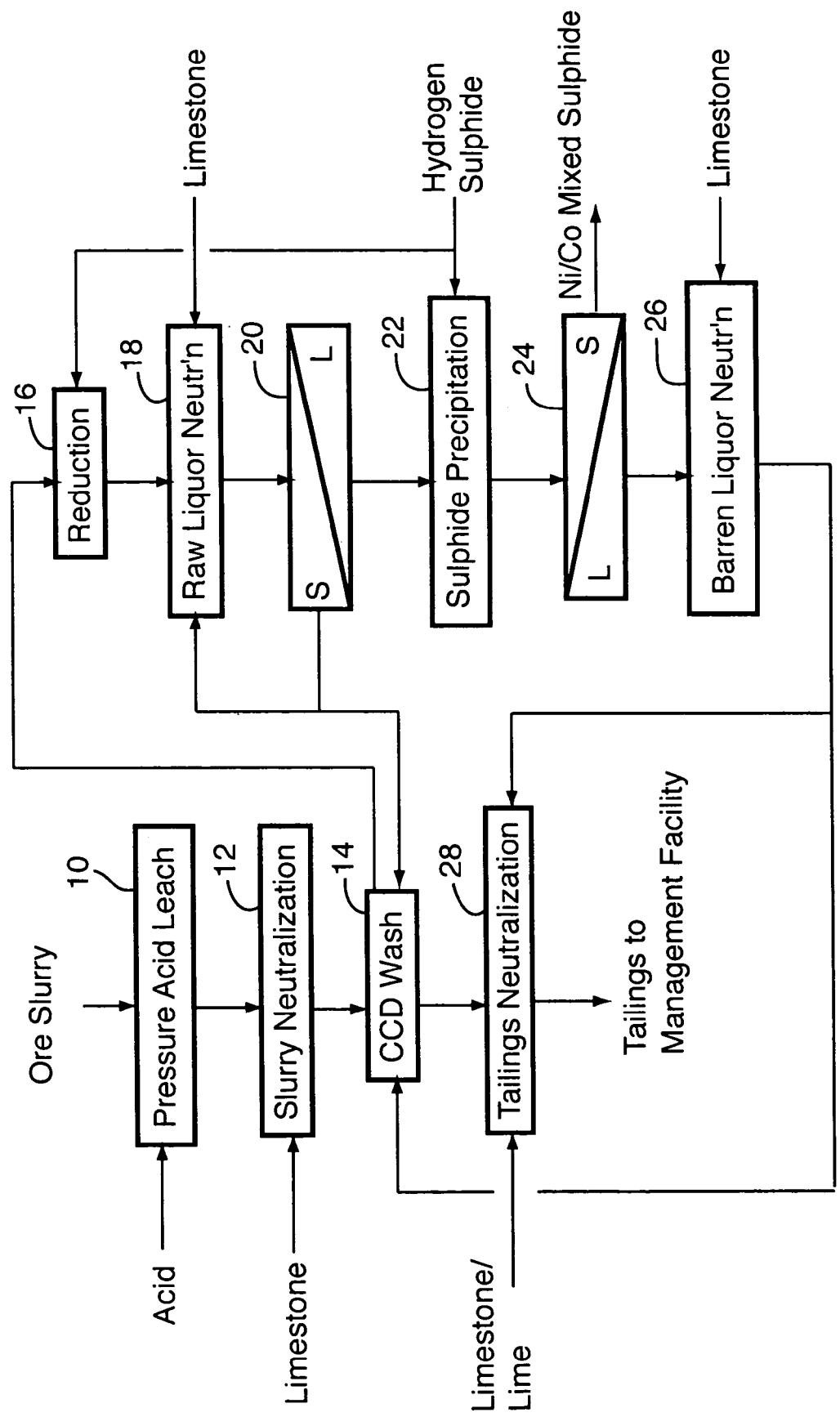
FIG. 1 is a schematic flowsheet of a preferred embodiment of the process of the invention for producing an enriched mixed nickel and cobalt sulphide intermediate.

With reference to the schematic flowsheet of accompanying FIG. 1, particulate laterite ore is leached with aqueous sulphuric acid at high temperature and pressure in a multi-compartment horizontal autoclave to extract nickel and cobalt values in pressure acid leach 10. Typical nickel- and cobalt-containing laterite ores for which the process is intended consist primarily of limonite and a minor amount of unweathered saprolite containing, by weight, about 1 to 1.5% Ni, 0.05 to 0.15% Co, 3 to 4% Al, 1.5 to 2% Cr, 45 to 50% Fe, 0.1 to 1.5% Mg, 0.5 to 1% Mn and 0.9 to 3% Si. The leach temperature range is 240 to 300° C., preferably 250 to 270° C., more preferably 260° C. The retention time in pressure leach 10 is 30 to 120 minutes, preferably 60 to 90 minutes. Excess acid in the pressure leach discharge slurry in an amount of at least 30 g/L free sulphuric acid, as measured at 25° C., is partially neutralized with limestone and/or saprolite in slurry neutralization 12. The temperature is maintained as hot as possible in slurry neutralization 12 without supplying extra heat, preferably 90 to 95° C. The retention time is 10 to 90 minutes, preferably 30 to 60 minutes. Sufficient limestone is added to neutralize the solution to the range of 5 to 10 g/L residual free $H_2SO_4$. Partial neutralization of the solution permits the use of less expensive materials in the following CCD wash circuit.

The slurry neutralization discharge is settled and washed in a CCD wash circuit 14 comprised of a series of several countercurrent wash thickeners for liquid-solid separation to separate leached nickel and cobalt together with dissolved aluminum, chromium, iron, magnesium, manganese and silicon from the residual solids. Gypsum solids produced in the slurry neutralization step 12 have been found to have better liquid-solid separation characteristics in CCD wash circuit 14 than gypsum produced in downstream neutralization steps. Soluble metal recovery in the CCD wash circuit 14 is increased as a result. Vacuum filtration with washing is an option for this process step.

The wash circuit product liquor is contacted with hydrogen sulphide, or another reductant, to reduce Cr(VI) in solution to Cr(III) in reduction 16. A small excess of hydrogen sulphide is used, to ensure complete reduction of Cr(VI). A small fraction of Fe(III) in the liquor is reduced by the excess hydrogen sulphide.

The reduced solution is further neutralized in raw liquor neutralization 18 with limestone to neutralize the residual free acid and to hydrolyze and precipitate impurities such as Fe(III), Cr(III), Al and silica, and the resulting slurry is thickened. The temperature range in the neutralization reactors, preferably comprised of stirred-tank reactors arranged in cascade, is 70 to 95° C., preferably 85° C. The pH range is pH 3.5 to 4.0, preferably pH 3.8. The retention time is 60 to 120 minutes, preferably 90 minutes. At this relatively high pH, ferric iron and silicon are precipitated to less than 0.1 g/L each, allowing for production of high purity mixed sulphide in the following sulphide precipitation step. The liquid-solid separation characteristics of the resulting slurry are also good in this pH range, allowing for a relatively simple solids recycle of thickener underflow slurry within the raw liquor neutralization circuit 18, compared with the more complicated solids recycle schemes practiced by Murrin Murrin and Coral Bay. The good liquid-solid separation characteristics also result in a relatively small load of nickel and cobalt in entrained liquor being directed to the CCD wash circuit. Precipitation of nickel and cobalt in the raw liquor neutralization step is very limited, but trace quantities of nickel and cobalt in the solids are recoverable owing to the recycle of solids within the raw liquor neutralization circuit and by directing the net production of solids to the CCD wash circuit, which is operated at a lower pH than the raw liquor neutralization circuit. The second wash thickener of the several wash thickeners is the optimum location for treating the raw liquor neutralization solids, so as to have sufficient acid available for redissolution of nickel and cobalt without significant redissolution of impurities such as ferric iron and aluminum, and to have sufficient stages for washing of soluble nickel and cobalt from the solids. The underflow slurry from raw liquor neutralization thickener 20 is recycled to the first neutralization tank in the raw liquor neutralization circuit 18. The recycle ratio is between 1 part and 4 parts of thickener underflow slurry to fresh precipitate in raw liquor neutralization 18, preferably about 2:1. The net flow of raw liquor neutralization thickener underflow slurry is directed to the CCD wash circuit, preferably stage 2.

The raw liquor neutralization thickener overflow solution is contacted with hydrogen sulphide gas in sulphide precipitation 22 to precipitate nickel and cobalt sulphides. The hydrogen sulphide requirement in the sulphide precipitation step is low because essentially all ferric iron is precipitated in the raw liquor neutralization step 18, at pH 3.8 to 4. Accordingly, there is no requirement to reduce ferric iron in solution with hydrogen sulphide prior to neutralization and sulphide precipitation. The conditions selected in the sulphide precipitation step are such that the concentration of copper in the feed solution need not be limited. That is, the presence of copper sulphide in the mixed sulphide does not adversely affect the liquid-solid separation characteristics. As a result, copper does not need to be precipitated prior to raw liquor neutralization and dissolution of copper in the wash circuit is not an issue. As such, the raw liquor neutralization solids can consistently be directed to near the front end of the CCD wash circuit 14 (e.g. stage 2), to take advantage of a greater number of washing stages.

The resulting slurry is clarified in liquid-solid separation 24 and the mixed sulphide intermediate product is washed. Zinc and copper in the solution also report to the mixed sulphide. The temperature range is 90 to 120° C., preferably 105° C. The hydrogen sulphide overpressure is 50 to 750 kPa, preferably 100 to 200 kPa. The retention time is 10 to 60 minutes, preferably 20 to 40 minutes.

Barren liquor from sulphide precipitation 22 recovered as an overflow from liquid-solid separation 24 is neutralized with limestone in barren liquor neutralization 26 and a portion is returned to the CCD wash circuit 14 as the wash solution. Barren liquor is recycled to the CCD wash circuit 14 to limit the need for fresh water addition, and to increase the concentration of metal sulphates, e.g. magnesium sulphate, in the feed solution to sulphide precipitation. These metal sulphates have a buffering effect, increasing the recovery of nickel and cobalt in sulphide precipitation. The barren liquor is partially neutralized prior to recycle to the wash circuit, to limit the redissolution of impurity elements such as iron and aluminum in the wash circuit. Without such pH control of the barren liquor, there would be a large recirculating load of ferric iron and aluminum in the solution, as these elements would be largely precipitated in the raw liquor neutralization circuit and redissolved in the wash circuit. Discharge slurry from the wash circuit 14 is combined with excess neutralized barren liquor, without temperature control, and further neutralized with limestone and lime to pH 7.5 to 9 in tailings neutralization 28, to produce acceptable slurry for tailings impoundment. Total retention time in the neutralization reactors of tailings neutralization 28 is about 60 minutes.

Clarifier underflow from the sulphide precipitation liquid-solid separation 24 is recycled to the sulphide precipitation reactor 22 to act as seed, thereby limiting scaling of the vessels with fresh precipitate; the net clarifier underflow slurry is washed and directed to the refinery. A portion of the mixed sulphide is ground before combining with the seed recycle, to provide sufficient surface area. Seed recycle rates are preferably 3 parts unground seed and 1 part ground seed per 1 part fresh precipitate.

The mixed sulphide product is well suited to further refining into product nickel and cobalt metals. Silicon, which can have a material influence on the quality of the nickel produced in the refinery if it is present in the mixed sulphide, typically is below the detection limit of 0.01%.

Figure 2:
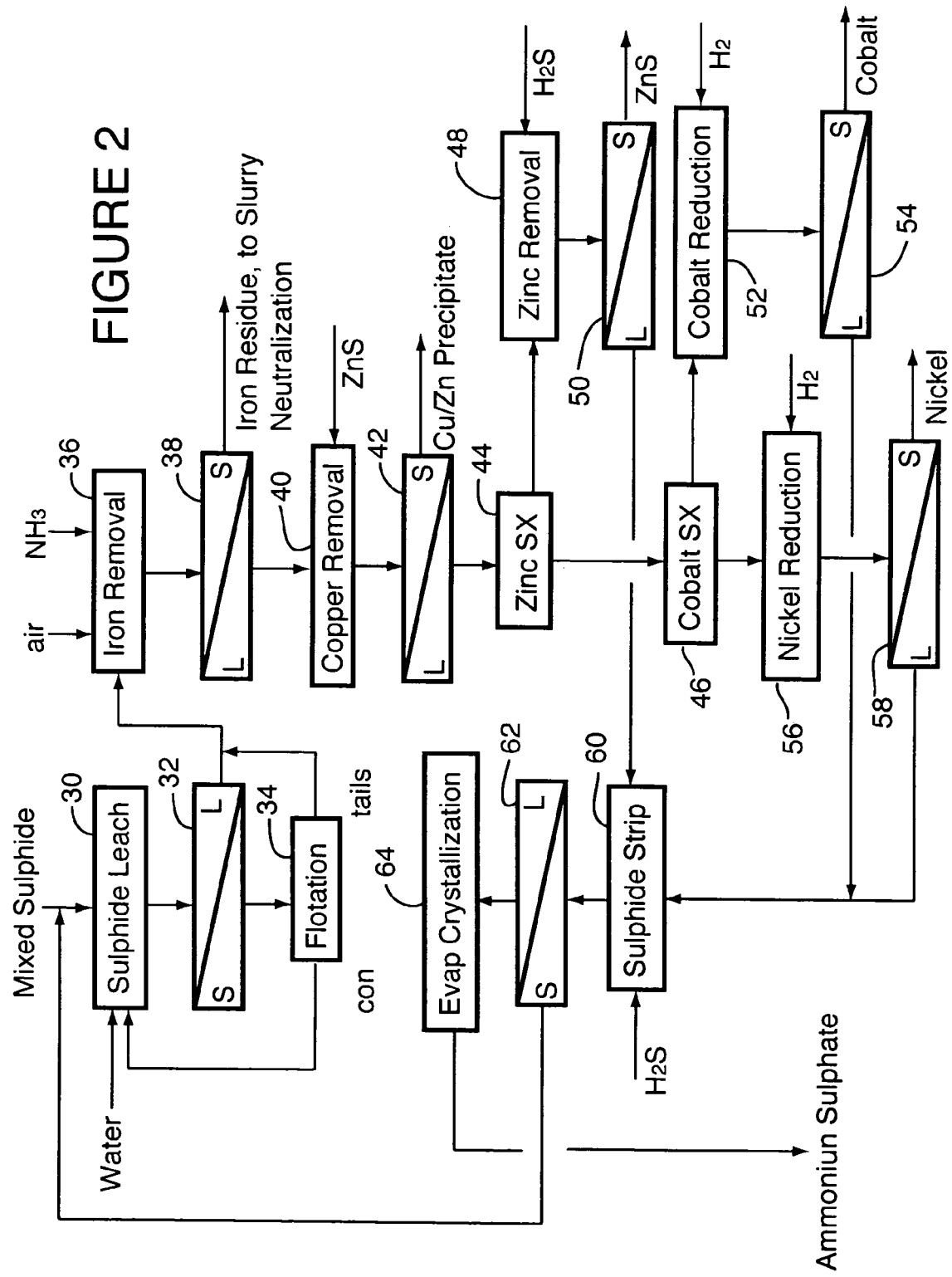
FIG. 2 is a schematic flowsheet of a preferred embodiment of a process of the invention for producing nickel and cobalt metals from an enriched mixed nickel and cobalt sulphide intermediate.

With reference now to FIG. 2, the net production of washed mixed metal sulphide from liquid-solid separation 24 is leached in process water, under oxygen pressure, in a multi-compartment horizontal autoclave in the sulphide leach 30. The leach may be carried out in a single stage or in two stages in series, with interstage thickening, not shown. Temperature control is accomplished by flash recycle of slurry from the first compartment of each autoclave and by recycle of sulphide leach thickener overflow solution and/or process water to subsequent compartments. Preferred conditions are 165° C. and 500 kPa oxygen overpressure, with a total solids retention time (in one or two stages of leaching) of 90 minutes.

Sulphide leach discharge slurry is thickened in thickener 32 and the thickener underflow slurry is treated in flotation 34 to recover unleached mixed sulphide to a flotation concentrate, which is recycled to the sulphide leach 30 to supplement the mixed sulphide feed. Flotation tailings is combined with sulphide leach thickener overflow solution and directed to iron removal circuit 36. The provision for flotation of the leach residue precludes the need for grinding of the mixed sulphide prior to leaching.

Acid in the mixed sulphide leach liquor is neutralized with ammonia or nickel hydroxide or other basic nickel compounds in the iron removal circuit 36, which is operated at about pH 4.5 to 5 to hydrolyze and precipitate ferric iron. Air is added to oxidize ferrous iron to the ferric oxidation state. The temperature in the circuit is about 90 to 95° C., owing to small heat losses following discharge from the sulphide leach, and the retention time is about 60 minutes. The resulting slurry is thickened and/or filtered in liquid-solid separation step 38 to remove the iron precipitate, which is directed to the slurry neutralization step 12 in the ore leach portion of the process to recover contained nickel and cobalt values.

Iron removal solution is contacted with zinc sulphide from the zinc removal step, to be discussed, to cement copper from the solution, in the copper removal step 40. The retention time is about 30 to 60 minutes. Product solids are separated for sale or disposal in liquid-solid separator 42, and product liquor composed of iron- and copper-free solution is directed to solvent extraction, which uses an organic phase containing Cyanex 272™ to extract zinc and cobalt in series, leaving nickel in the raffinate. The solvent extraction circuit includes a zinc extraction, scrubbing and stripping section 44, and a cobalt extraction, scrubbing and stripping section 46, well-known in the art. Separate zinc and cobalt sulphate solutions are produced along with a substantially cobalt-free raffinate containing the nickel from cobalt extraction 46. Ammonia is used to control pH in the extraction stages. Sulphuric acid solution is used to strip the loaded organic. Dilute cobalt sulphate product solution is used to scrub the cobalt loaded organic prior to stripping.

The product zinc sulphate solution from the zinc solvent extraction section 44 is contacted with hydrogen sulphide gas to precipitate zinc sulphide in zinc removal 48. A portion of the zinc sulphide precipitate from liquid-solid separator 50 is used in the copper removal step 40; the remainder is sold or stockpiled. The cobalt sulphate solution is reduced with hydrogen in cobalt reduction 52 to produce cobalt powder, which is recovered from liquid-solid separation 54.

Nickel sulphate solution from cobalt extraction 46 is reduced with hydrogen in nickel reduction 56 to produce nickel powder, which is recovered from liquid-solid separation 58.

The reduction end solutions from liquid-solid separations 54 and 58 proceed to sulphide stripping 60, where they are combined and contacted with hydrogen sulphide gas to precipitate residual metals. The thickened solids from liquid-solid separation 62 are recycled to the sulphide leach 30. Ammonium sulphate is recovered from the sulphide strip solution by evaporative crystallization 64.

The process of the invention will now be described with reference to the following non-limitative examples.

EXAMPLE 1

The following example details the results of a nine-day continuous pilot plant campaign testing the flowsheet shown in FIG. 1.

Laterite ore containing (wt %): 1.13 to 1.29 Ni, 0.056 to 0.114 Co, 3.11 to 3.54 Al, 1.53 to 1.81 Cr, 46.2 to 49.2 Fe, 0.014 to 1.03 Mg, 0.51 to 0.83 Mn and 0.99 to 2.53 Si was fed to the first compartment of a continuous, multi-compartment horizontal autoclave of about 30 L operating volume. Sulphuric acid was separately fed to the same autoclave compartment, in sufficient quantity that the autoclave discharge solution contained at least 30 g/L free sulphuric acid, as measured at room temperature. This required addition of 0.22 to 0.30 tonnes of acid per tonne of ore solids. The retention time in the autoclave was between 70 and 80 minutes and it was operated at 260° C. Nickel extraction from the ore ranged from 95 to 97%; cobalt extraction was 93 to 97%. The autoclave discharge solution contained (g/L): 6 to 7 Ni, 0.35 to 0.55 Co, 4.8 to 6.2 Al, 0.4 to 0.5 Cr, 1.8 to 2.6 Fe, 0.6 to 3.2 Mg, 2.8 to 3.4 Mn and 37 to 50 g/L free sulphuric acid.

Autoclave discharge slurry was pumped to the first of three agitated tanks in cascade, along with limestone slurry, with the slurry maintained at 90° C. in these reactors. The total retention time in the three reactors was 1 h. The terminal acid concentration was 7 to 8 g/L free sulphuric acid. The concentration of iron in the solution decreased by 0.2 to 0.5 g/L across the circuit. There was no detectable precipitation of nickel or cobalt.

The discharge from the third reaction tank of the slurry neutralization circuit was directed to the first thickener of a bank of seven counter-current decantation thickeners, each of about 100 L volume. Thickener underflow slurry from the raw liquor neutralization circuit was directed to the second CCD thickener, while neutralized barren liquor was added as the wash liquor to the repulp tank feeding the seventh CCD thickener. The volumetric ratio of wash liquor to solution entrained in underflow slurry from the seventh thickener was between 1.7:1 and 1.8:1. The solids content of the thickener underflow slurries across the circuit and throughout nine days of operation ranged from 43 to 54% by weight. The soluble losses of nickel and cobalt to the underflow slurry from the seventh thickener were less than 1% each. There was no measurable difference in the nickel and cobalt content of these solids compared with the autoclave discharge solids, i.e. insoluble losses attributable to precipitation of nickel and cobalt in the neutralization and washing steps were nil.

First wash thickener overflow solution was directed to the raw liquor neutralization circuit, which included a cascade of four agitated neutralization tanks and a 100-L thickener. The solution was fed to the first of the neutralization tanks, along with recycled raw liquor neutralization thickener underflow slurry; limestone was added to the second and third tanks. The overall retention time in the four neutralization tanks was 90 minutes, and they were operated at 85° C. The pH was maintained at 3.8. The solids recycle rate was 2:1; the net production of thickener underflow slurry, one third of the flow of this slurry, was directed to the wash circuit. The thickener underflow slurry contained 37 to 43% solids by weight. Essentially all of the ferric iron, most of the silica and about 50% of the aluminum in the feed solution were precipitated. The neutralized solution contained (g/L): 4.2 to 4.8 Ni, 0.24 to 0.40 Co, 1.6 to 3.1 Al, 0.1 to 0.2 Cr, 0.1 to 0.5 Fe, 0.8 to 3.0 Mg, 2.7 to 3.4 Mn and less than 0.1 Si. The net thickener underflow solids contained <0.5% of the Ni and <0.3% of the Co in the feed solution; these values redissolved in the wash circuit.

The product liquor from the raw liquor neutralization circuit was blended and fed to a continuous sulphide precipitation circuit, which was operated after the pilot plant campaign described above was completed. The sulphide precipitation reactor was a multi-compartment horizontal autoclave. The feed solution was combined with seed in the first compartment of the vessel, which was operated at 105° C. with 200 kPa hydrogen sulphide overpressure. The retention time in the autoclave was 41 to 45 minutes. Compartment samples withdrawn from the autoclave indicated that the precipitation reactions were essentially complete in 20 to 25 minutes (compartment 3). The seed consisted of recycled mixed sulphide solids, at a rate of 3.5 parts seed to 1 part fresh precipitate. One quarter of the seed was ground in an attritor prior to feeding to the autoclave. The autoclave discharge slurry was directed to a clarifier for separation of the solids. Recoveries of nickel and cobalt to the clarifier underflow solids were 99.5 and 99.2%, respectively. The analysis of the mixed sulphide intermediate product was (wt %): 55.2 Ni, 4.2 Co, 34.3 S, 0.2 Al, 0.1 Cr, 0.5 Cu, 0.3 Fe, <0.01 Si and 1.6 Zn.

EXAMPLE 2

The mixed sulphide intermediate product described in Example 1 was processed in a single-compartment autoclave of 7.5 L operating volume to solubilize nickel and cobalt. The autoclave was operated in batch fashion owing to the small quantity of material to be processed. Test conditions were 165° C. and 500 kPa oxygen overpressure. Extractions were 99.0 to 99.3% for nickel and 98.3 to 98.8% for cobalt. The composite product solution contained (g/L): 95 Ni, 7.0 Co, 0.01 Al, 0.16 Cr, 0.78 Cu, 0.32 Fe, 0.01 Mg, 0.02 Mn, 0.05 Si, 9.0 $H_2SO_4$ and 2.7 Zn.

The residues from several of the leach tests were collected, and separately repulped in product liquor in a 2-L flotation cell to about 2 vol % solids. Air was applied and flotation was carried out at 60 to 70° C., without any additives, yielding 98 to 99% recovery of nickel and cobalt to the flotation concentrates.

The sulphide leach liquor was heated to 95° C. in an agitated, atmospheric tank and sparged with oxygen. Aqueous ammonia was added to raise the solution pH to between 4.8 and 5.2. After 60 min, the slurry was filtered and 5 g/L of ZnS solids was added to the filtrate in a second agitated, atmospheric tank, which was maintained at 95° C. for 60 min. The final slurry in the test was filtered and the filtrate contained (g/L): 90 Ni, 6.6 Co, <0.001 Al, <0.001 Cr, 0.001 Cu, 0.004 Fe and 3.2 Zn.

The copper- and iron-free sulphide leach liquor was processed in a continuous solvent extraction circuit including two stages of zinc extraction, one stage of zinc stripping, four stages of cobalt extraction, four stages of scrubbing of the cobalt-loaded organic and two cobalt stripping stages. Each mixer was a cylindrical glass vessel with a working volume of 440 mL; the settlers were also cylindrical glass vessels, each with a working volume of 950 mL. The aqueous addition rate to the circuit was 950 mL/min. The organic phase contained 15 vol % Cyanex 272. The operating temperature was 55° C. Ammonia or sulphuric acid solutions were added as required to maintain targets of pH 2.7 to 3.0 in zinc extraction, pH 5.2 to 5.4 in cobalt extraction and pH 4.7 in cobalt scrubbing. The cobalt and zinc strip solutions contained 144 g/L $H_2SO_4$ and the solution used to scrub the cobalt-loaded organic contained 20 g/L Co. The product solution compositions are given in Table I.

TABLE I

Solvent Extraction Product Solution Composition

|  | Zn Product Solution | Co Product Solution | Ni Raffinate |
|---|---|---|---|
| Ni, g/L | 0.151 | 0.003 | 76.5 |
| Co | 0.188 | 92.2 | 0.061 |
| Al | 0.002 | 0.004 | <0.002 |
| $NH_3$t | 0.13 | 0.004 | 9.60 |
| Cr | 0.206 | <0.0001 | <0.0002 |
| Cu | 0.001 | 0.013 | <0.001 |
| Fe | 0.031 | 0.015 | <0.002 |
| Si | <0.005 | <0.005 | <0.01 |
| $H_2SO_4$ | 62.5 | | |
| Zn | 60.6 | 0.057 | <0.001 |

Cobalt product solution was contacted with 0.3 g/L ZnS, at 50° C., for 30 minutes in an agitated tank at atmospheric pressure, and then filtered. The resulting solution contained <0.0005 g/L Cu. This solution was contacted with 10 g/L activated carbon to collect organics and the activated carbon was filtered off. The filtrate was then fortified with ammonia and ammonium sulphate and reacted in an autoclave, at 180° C. and under 2550 kPa hydrogen pressure, to produce cobalt powder. Commercial ultrafine cobalt powder was used as seed. The nickel raffinate described above was contacted with 10 g/L activated carbon to remove entrained and dissolved organics and was filtered. The filtrate was fortified with ammonia and ammonium sulphate and contacted with hydrogen, and fine nickel powder as seed, in an autoclave. The autoclave was operated at 185° C. and under 2400 kPa hydrogen pressure. Calculated analyses of the nickel and cobalt powder products, determined by arithmetically removing the contributions of the seed powders, are provided in Table II.

TABLE II

Nickel and Cobalt Powder Composition

|  | Nickel Powder | Cobalt Powder |
|---|---|---|
| Al, % | <0.001 | <0.001 |
| Sb | <0.0001 | <0.0001 |
| As | 0.0004 | 0.0004 |
| Bi | <0.0001 | <0.0001 |
| C | 0.124 | 0.233 |
| Cr | 0.0003 | 0.0001 |
| Co | 0.0008 | |
| Cu | 0.0007 | <0.0005 |
| Fe | 0.018 | 0.0004 |
| Pb | <0.0001 | <0.0001 |
| Mn | <0.0005 | 0.0005 |
| Ni | | 0.018 |
| Se | 0.0008 | <0.0001 |
| Si | 0.004 | 0.002 |
| S | 0.006 | 0.024 |
| Sn | <0.0001 | <0.0001 |
| Zn | <0.005 | 0.002 |

It will be understood that other embodiments and examples of the invention will be readily apparent to a person skilled in the art, the scope and purview of the invention being defined in the appended claims.

The invention claimed is:

1. A process for producing an enriched mixed nickel and cobalt sulphide intermediate from a laterite ore slurry containing nickel, cobalt, copper, chromium, zinc, iron and silicon, comprising leaching the laterite ore slurry in a pressure acid leach containing an excess of aqueous sulphuric acid at high pressure and temperature for a time sufficient to extract nickel and cobalt, partially neutralizing excess free acid in the leached slurry with limestone to a range of 5 to 10 g/L residual free $H_2SO_4$, washing the partially neutralized leached slurry to separate leached nickel and cobalt in a product liquor from residual solids, subjecting the product liquor to a reductant to reduce Cr(VI) in solution to Cr(III), neutralizing the reduced product liquor for hydrolyzing and precipitating impurities including ferric iron and silicon at a pH at about 3.5 to 4.0, separating precipitated solids from the neutralized liquor by a liquid-solid separation, and contacting the neutralized liquor with hydrogen sulphide gas to precipitate nickel and cobalt sulphides.

2. A process as claimed in claim 1, in which the laterite ore slurry is leached in the acid pressure leach at a temperature in the range of about 240 to 300° C., at a pressure in the range of about 450 to 1300 psig, for a retention time of 30 to 120 minutes, and with an excess of aqueous sulphuric acid of at least 30 g/L of free sulphuric acid as measured at 25° C.

3. A process as claimed in claim 2, in which the laterite ore slurry is leached in the acid pressure leach at a temperature in the range of about to 250 to 270° C. with a retention time of 60 to 90 minutes.

4. A process as claimed in claim 1, in which the excess acid in the leach slurry is partially neutralized with an effective amount of limestone, at a temperature in the range of 90 to 95° C. and a retention time of about 30 to 60 minutes, to produce a solution containing 5 to 10 g/L free sulphuric acid.

5. A process as claimed in claim 1, in which product liquor is reduced with an excess of hydrogen sulphide for substantially complete reduction of Cr(VI) to Cr(III) and a partial reduction of any Fe(III).

6. A process as claimed in claim 5, in which the reduced product liquor is neutralized by the addition of limestone at a temperature in the range of 70 to 95° C. at a pH of about 3.8 for a retention time of about 60 to 120 minutes to hydrolyze and precipitate any Fe(III) and silicon.

7. A process as claimed in claim 6, in which the silicon is precipitated to less than 0.1 g/L.

8. A process as claimed in claim 6, in which at least a portion of precipitated solids from the neutralized liquor is recycled to the step of neutralizing the reduced product liquor in a ratio of between 1 to 4 parts of recycle solids to freshly precipitated solids.

9. A method as claimed in claim 8, in which the ratio of recycle solids from the neutralized liquor to freshly precipitated solids is about 2:1.

10. A process as claimed in claim 6, in which the neutralized liquor is contacted with hydrogen sulphide gas with a hydrogen sulphide overpressure in the range of 50 to 750 kPa for a retention time of 10 to 60 minutes to precipitate mixed sulphides of nickel and cobalt containing sulphides of any zinc and copper.

11. A process as claimed in claim 10, thickening the mixed sulphides in a thickener to yield a mixed sulphide product and a barren liquor, neutralizing the barren liquor with limestone and washing the neutralized leach slurry with the neutralized barren liquor.

12. A process as claimed in claim 1, additionally comprising leaching the precipitated nickel and cobalt sulphides in a water slurry under oxygen pressure, thickening the leached precipitated nickel and cobalt sulphide slurry to produce a thickener underflow slurry and thickener overflow solution, subjecting the thickener underflow slurry to flotation for separating unleached mixed sulphide as a flotation concentrate from flotation tailings, combining flotation tailings with sulphide leach thickener overflow solution and subjecting the combined flotation tailings and sulphide leach overflow solution to iron hydrolysis and precipitation and separating the iron precipitate, contacting the iron-free solution with zinc sulphide to precipitate copper, removing the copper precipitate and subjecting the iron- and copper-free solution to solvent extraction to extract zinc and cobalt to produce a nickel raffinate, contacting the nickel raffinate with hydrogen gas to produce nickel powder and contacting the cobalt strip solution from solvent extraction with hydrogen gas to produce cobalt powder.

* * * * *

UNITED STATES PATENT AND TRADEMARK OFFICE
CERTIFICATE OF CORRECTION

PATENT NO. : 7,387,767 B2 Page 1 of 1
APPLICATION NO. : 11/100814
DATED : June 17, 2008
INVENTOR(S) : Finlay Campbell et al.

It is certified that error appears in the above-identified patent and that said Letters Patent is hereby corrected as shown below:

Title Pg, Item (54) Title:
The title of invention should correctly be read "PROCESS FOR RECOVERY OF NICKEL AND COBALT FROM LATERITE ORE".

Signed and Sealed this

Twentieth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 7,387,767 B2  Page 1 of 1
APPLICATION NO. : 11/100814
DATED : June 17, 2008
INVENTOR(S) : Finlay Campbell et al.

It is certified that error appears in the above-identified patent and that said Letters Patent is hereby corrected as shown below:

Title Pg, Item (54) and Column 1, lines 1-4, Title:
The title of invention should correctly be read "PROCESS FOR RECOVERY OF NICKEL AND COBALT FROM LATERITE ORE".

This certificate supersedes the Certificate of Correction issued January 20, 2009.

Signed and Sealed this

Seventeenth Day of February, 2009

JOHN DOLL
*Acting Director of the United States Patent and Trademark Office*